United States Patent [19]

Takeuchi

[11] Patent Number: 4,524,625
[45] Date of Patent: Jun. 25, 1985

[54] PRESSURE SENSOR

[75] Inventor: Kiyoshi Takeuchi, Yokohama, Japan

[73] Assignee: Nissan Motor Company, Limited, Japan

[21] Appl. No.: 574,693

[22] Filed: Jan. 24, 1984

[30] Foreign Application Priority Data

Jan. 31, 1983 [JP] Japan ................................. 58-14380

[51] Int. Cl.³ ............................................. F16B 31/02
[52] U.S. Cl. ......................................... 73/754; 73/35;
73/115; 73/761; 73/DIG. 4; 338/4
[58] Field of Search ........... 338/4, 42; 73/761, 862.68, 73/DIG. 4, 115, 35, 754, 729; 310/338

[56] References Cited

U.S. PATENT DOCUMENTS

| 3,945,704 | 3/1976 | Kraus et al. | 73/761 |
|---|---|---|---|
| 3,948,141 | 4/1976 | Shinjo | 73/761 |
| 4,106,370 | 8/1978 | Kraus et al. | 73/761 |
| 4,399,705 | 8/1983 | Weiger et al. | 73/DIG. 4 |
| 4,430,899 | 2/1984 | Wessel | 73/DIG. 4 |
| 4,450,811 | 5/1984 | Ichikawa | 73/35 |

FOREIGN PATENT DOCUMENTS 40-10332 4/1965 Japan .

Primary Examiner—Donald O. Woodiel
Attorney, Agent, or Firm—Lowe, King, Price & Becker

[57] ABSTRACT

A pressure transducer suitable for remote sensing of pressure in hostile environments consists generally of a body and a sensing member. The body has first and second opposing inner surfaces defining an inside space therebetween. The sensing member is disposed within the inside space and has first and second opposite surfaces. The first surface of the sensing member contacts the first inner surface of the body. The second surface of the sensing member is separated from the second inner surface of the body by a predetermined clearance so that the second surface of the sensing member comes into contact with the second inner surface of the body only when the external force exerted on the body exceeds a predetermined level.

11 Claims, 17 Drawing Figures

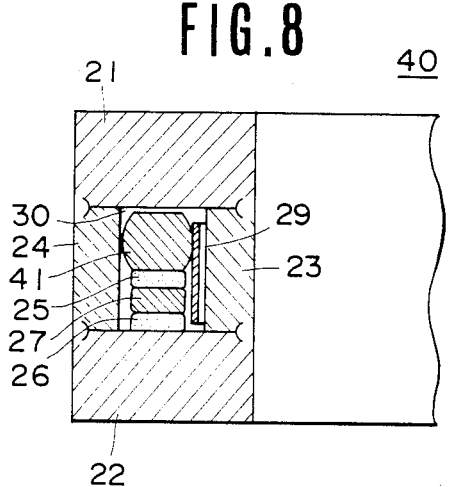
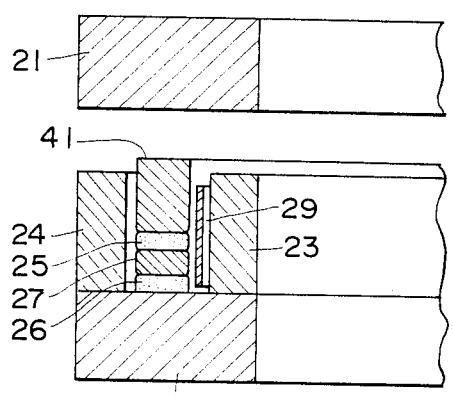
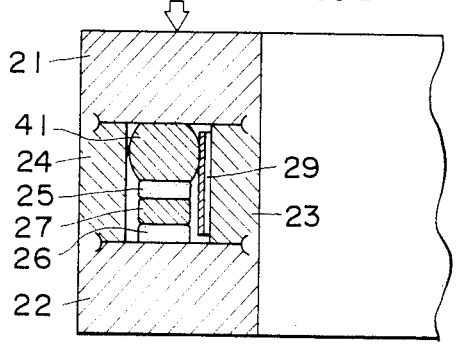

PRESSURE SENSOR

BACKGROUND OF THE INVENTION

1. Field of the Invention

This invention relates to a pressure sensor adaptable, for example, to sensing pressure in the combustion chamber or chambers of an internal combustion engine.

2. Description of the Prior Art

It is well-known to indirectly sense pressure in the combustion chamber of an internal combustion engine by means of an external device attached to the engine cylinder head. This pressure sensor takes the form of a washer and fits around a cylinder head bolt attaching the cylinder head to the engine cylinder block. The pressure sensor is clamped between the cylinder head and the bolt in a manner similar to a normal washer. The pressure sensor includes a piezoelectric element deformed by the force resulting from air/fuel mixture combustion in the engine cylinder. The piezoelectric element serves to generate an electrical signal reflecting the pressure in the combustion chamber.

Generally, the accuracy of piezoelectric elements in sensing force or pressure decreases as their internal stress increases. In the above-mentioned pressure sensor, the piezoelectric element is continuously under intense stress due to the static clamping force between the cylinder head and the cylinder block. As a result, the accuracy of this pressure sensor is relatively low.

SUMMARY OF THE INVENTION

It is an object of this invention to provide a more accurate pressure sensor adaptable, for example, to sensing pressure in the combustion chamber or chambers of an internal combustion engine.

In accordance with this invention, a pressure sensor includes a body and a sensing element. The body has first and second opposing inner surfaces defining an inside space therebetween. A sensing member is disposed within the inside space and has first and second opposite surfaces. The first surface of the sensing member contacts the first inner surface of the body. The second surface of the sensing member is separated from the second inner surface of the body by a predetermined clearance so that the second surface of the sensing member comes into contact with the second inner surface of the body only when an external force exerted on the body exceeds a predetermined level.

The above and other objects, features and advantages of this invention will be apparent from the following description of preferred and alternative embodiments thereof, taken in conjunction with the drawings.

BRIEF DESCRIPTION OF THE DRAWINGS

FIG. 8 is a longitudinal section of a first modified pressure sensor of this invention.

FIG. 9 is a longitudinal section of the first modified pressure sensor before the upper and lower discs are welded to the inner and outer rings.

FIG. 10 is a longitudinal section of the first modified pressure sensor under conditions where the upper and lower discs are being welded to the inner and outer rings.

Like and corresponding elements are denoted by the same reference numerals throughout the drawings.

DESCRIPTION OF THE PREFERRED EMBODIMENTS

Figure 1:
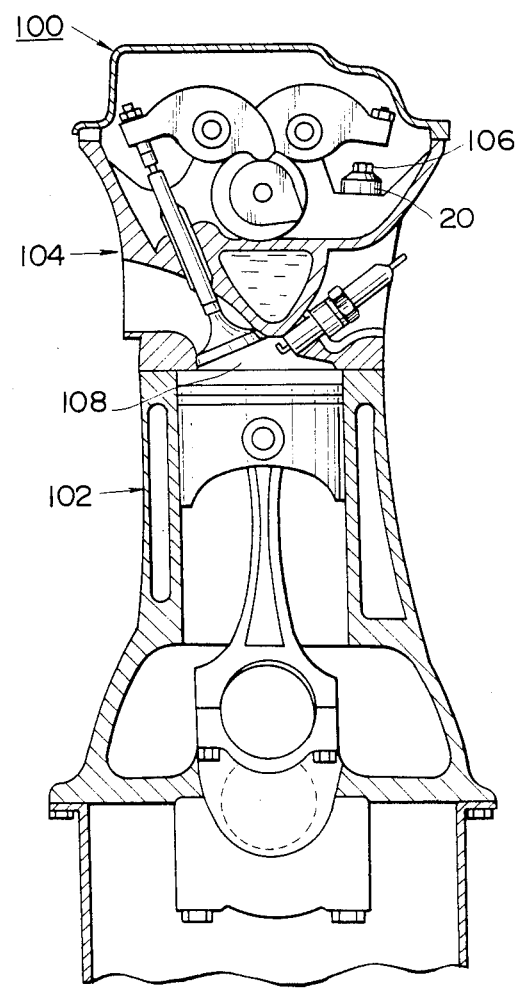
FIG. 1 is a vertical cross-section of an internal combustion engine in which a pressure sensor of this invention is installed.

With reference to FIG. 1, an internal combustion engine 100 includes a cylinder block 102 and a cylinder head 104 attached to the cylinder block 102 by means of cylinder head bolts 106 (only one of which is shown). The cylinder block 102 and the cylinder head 104 define combustion chambers 108 (only one of which is shown). An annular pressure sensor 20 takes the form of a washer and fits around the section of the bolt 106 protruding from the cylinder head 104. The pressure sensor 20 is clamped between the cylinder head 104 and the head of the bolt 106 in a manner similar to a normal washer.

Figure 2:
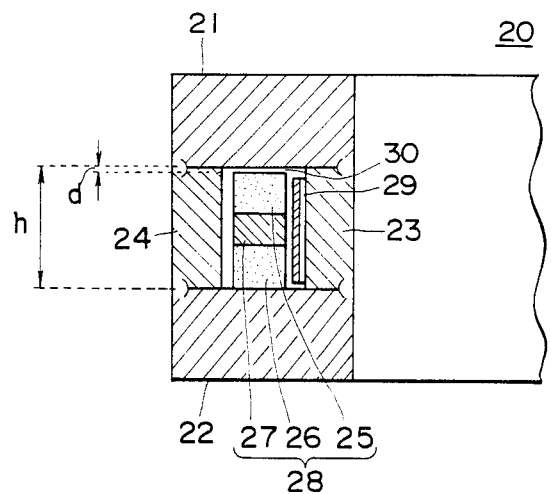
FIG. 2 is a longitudinal section of the pressure sensor of FIG. 1.
Figure 3:
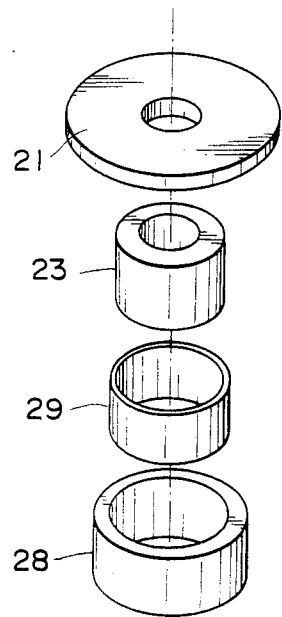
FIG. 3 is an exploded view of the pressure sensor of FIG. 1.

FIGS. 2 and 3 show the details of the pressure sensor 20. The pressure sensor 20 includes a casing or body having a pair of upper and lower metal discs 21 and 22 aligned and separated axially. These discs 21 and 22 both have central bores accommodating the cylinder head bolt. The body of the pressure sensor 110 has concentrically arranged inner and outer rings 23 and 24 interposed coaxially between the discs 21 and 22. These rings 23 and 24 have equal axial dimensions, which match the separation of the discs 21 and 22. The rings 23 and 24 are radially spaced to define an annular inside space in conjunction with the discs 21 and 22. The rings 23 and 24 are made of relatively rigid metal, such as steel. Upper faces of the rings 23 and 24 are welded to the lower face of the upper disc 21. Lower faces of the rings 23 and 24 are welded to the upper face of the lower disc 22. The central bore of the inner ring 23 is designed to accommodate the cylinder head bolt.

A ring-shaped sensing member 28 is disposed in the inside space coaxially with respect to the discs 21 and 22. The sensing member 28 includes axially aligned ring-shaped electro-mechanical transducing members 25 and 26, such as ceramic piezoelectric elements, and a ring electrode 27 sandwiched between the transducers 25 and 26 in axial alignment therewith. The upper face of the electrode 27 contacts and is attached to the lower face of the upper piezoelectric element 25. The lower face of the electrode 27 contacts and is attached to the upper face of the lower piezoelectric element 26. The piezoelectric elements 25 and 26 are oppositely polarized in the axial direction so that the faces of the piezoelectric elements 25 and 26 in contact with the electrode 27 have equal polarities.

The sensing member 28 is spaced radially from both of the rings 23 and 24, so that the electrode 27 is electrically insulated from the rings 23 and 24. An insulating tube 29 is disposed in the section of the inside space between the sensing member 28 and the inner ring 23 in order to ensure the electrical insulation between the electrode 27 and the inner ring 23. A terminal (not shown) is mounted on the outer cylindrical surface of the outer ring 24. Leads (not shown) extend from the electrode 27 to the terminal through a radial hole (not shown) in the outer ring 24 in order to electrically connect the electrode 27 and the terminal. The leads are electrically insulated from the outer ring 27 by insulating material (not shown) covering them.

The lower face of the lower piezoelectric element 26 contacts and is attached to the upper face of the lower disc 22. The lower piezoelectric element 26 serves to produce an electrical signal or voltage between the lower disc 22 and the electrode 27.

The upper piezoelectric element 25 of the sensing member 28 is spaced axially from the upper disc 21 by a predetermined clearance 30 in its original condition where the pressure sensor 20 is detached from the bolt 106. The upper face of the piezoelectric element 25 is brought into contact with the lower face of the upper disc 21 when the pressure sensor 20 is attached in place around the bolt 106, as described in more detail below. The upper piezoelectric element 25 serves to produce an electrical signal or voltage between the upper disc 21 and the electrode 27.

The pressure sensor 20 fits around the bolt 106 in such a manner that the bolt 106 extends through the central bores of the discs 21 and 22, and the inner ring 23. The top surface of the pressure sensor 20 contacts the head of the bolt 106. The bottom surface of the pressure sensor 20 contacts the cylinder head 104. In this way, the pressure sensor 20 is clamped between the bolt 106 and the cylinder head 104. The output signal of the pressure sensor 20 is transmitted via its body and terminal.

Figure 4:
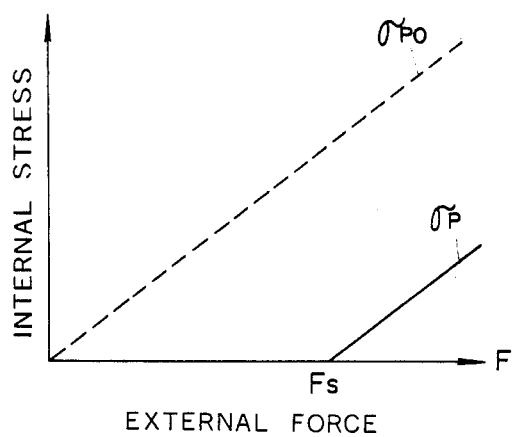
FIG. 4 is a graph of the relationship between the external force exerted on the pressure sensor and the internal stress of the piezoelectric elements of FIGS. 2 and 3.

As shown in FIG. 4, as the external force F applied to the pressure sensor 20 increases from zero to a preset threshold level Fs, internal stress $\sigma p$ of the piezoelectric elements 25 and 26 remains zero, since the clearance 30 is maintained and hence the sensing member 28 remains out of contact with the upper disc 21 and so is not subject to any external force. When the external force F reaches the threshold level Fs, elastic deformation of the body of the sensor 20 reaches the point where the clearance 30 is traversed and thus the sensing member 28 comes into contact with the upper disc 21. As the external force F increases from the threshold level Fs, the internal stress $\sigma p$ increases linearly with the external force F. In FIG. 4, the broken line indicates the relationship between external force F and internal stress $\sigma po$ of the piezoelectric elements 25 and 26 obtained under conditions in which the sensing member 28 is in contact with the upper disc 21 in the relaxed state, which corresponds to the conventional case. As is apparent from FIG. 4, this internal stress $\sigma po$ increases proportionally with increases in the external force F from zero.

Figure 5:
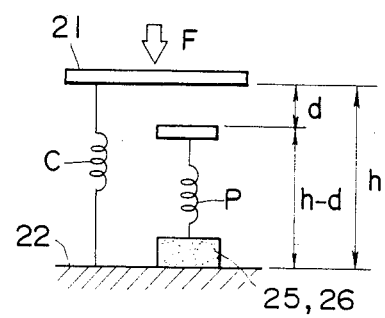
FIG. 5 is a diagram of the mechanical equivalent of the pressure sensor of FIG. 1.

FIG. 5 is a diagram of a mechanical system to the pressure sensor 20. The combination of the rings 23 and 24 is represented by a spring C having a spring constant or modulus kc. The sensing member 28 is represented by a spring P having a spring constant or modulus kp. The clearance 30 has a value d when the body of the sensor 20 is not subject to any external force. The axial dimension or length of the rings 23 and 24 has a value h when the body of the sensor 110 is under the same conditions.

Figure 6:
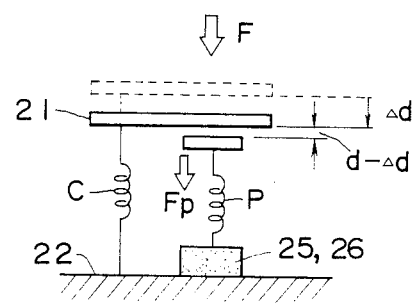
FIG. 6 is a diagram of the mechanical equivalent of the pressure sensor of FIG. 1 under conditions where an external force exerted on the pressure sensor is at such a level that the upper disc does not reach the piezoelectric element.

When the external force F applied to the upper disc 21 is less than the threshold level Fs, which may be represented as Fs=dkc, the displacement $\Delta d$ of the upper ring 21 resulting from contraction of the spring C is smaller than the clearance value d so that all of the external force F is exerted on the spring C, not on the spring P, as shown in FIG. 6. Thus, Fp=0, where Fp is the force applied to the spring P.

Figure 7:
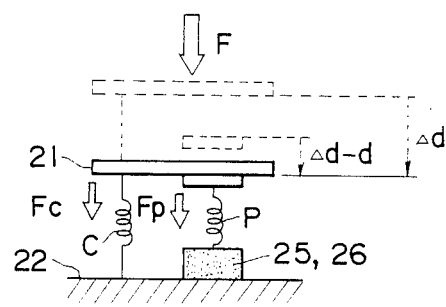
FIG. 7 is a diagram of the mechanical equivalent of the pressure sensor of FIG. 1 under conditions where an external force exerted on the pressure sensor is at such a level that the upper disc contacts the piezoelectric element.

When the external force F applied to the upper disc 21 is greater than the threshold level Fs, the displacement $\Delta d$ of the upper ring 21 is larger than the clearance value d so that the external force F is exerted on both of the springs C and P, as shown in FIG. 7. Therefore, the external force F is expressed by the following equations:

$$F = Fc + Fp \tag{1}$$

where $$Fc = \Delta d\, kc \tag{2}$$

$$Fp = (\Delta d - d)kp \tag{3}$$

The elimination of $\Delta d$ and Fc from equations (1) to (3) results in the following equation (4).

$$Fp = (F - dkc)kp/(kc + kp) \tag{4}$$

In general, the spring constant or modulus k of a material is given as follows:

$$k = EA/l \tag{5}$$

where E, A, and l are the Young's modulus, the cross-sectional area, and the length of the material, respectively.

Accordingly, the spring constants or moduli kc and kp are given as follows:

$$kc = EcAc/h \tag{6}$$

$$kp = EpAp/(h-d) \tag{7}$$

where Ec is the Young's modulus of the rings 23 and 24, Ep is the Young's modulus of the sensing member 28 (assuming that the Young's modulus of the piezoelectric elements 25 and 26 is equal to the Young's modulus of the electrode 27), Ac is the sum of the cross-sectional areas of the rings 23 and 24, and Ap is the cross-sectional area of the sensing member 28.

The elimination of kc and kp from equation (4) by substitution of equations (6) and (7) results in the following equation.

$$Fp = \frac{Ep \frac{Ap}{h-d}}{Ec \frac{Ac}{h} + Ep \frac{Ap}{h-d}} \left( F - dEc \frac{Ac}{h} \right) \quad (8)$$

Since $\sigma p = Fp/Ap$, $$\sigma p = \frac{\frac{Ep}{h-d}}{Ec \frac{Ac}{h} + Ep \frac{Ap}{h-d}} \left( F - Ec \frac{Ac}{h} \right) \quad (9)$$

Since $d << h$, $h - d \approx h$. Thus, $$\sigma p \approx \frac{Ep}{EcAc + EpAp} \left( F - dEc \frac{Ac}{h} \right) \quad (10)$$

Note that $\sigma p \geq 0$.

It is understood from equation (10) that the internal stress $\sigma p$ remains zero until the external force F increases to a value of $dEcAc/h$. Therefore, $Fs = dEcAc/h$.

The value d of the clearance 30 will be derived below. The maximum external force F applied to the discs 21 and 22 is indicated by Fmax, and the internal stress of the piezoelectric elements 25 and 26 due to the maximum external force Fmax is indicated by $\sigma p$max. By reference to equation (10), the clearance value d is given as follows:

$$d = \frac{h}{EcAc} \left\{ Fmax - \sigma pmax \frac{EcAc + EpAp}{Ep} \right\} \quad (11)$$

In the case where the pressure sensor 110 is clamped by the cylinder head bolt 106 as explained previously, it is assumed that the inside diameter of the sensor 110 is 10 mm, the outside diameter of the sensor 110 is 23.4 mm, the discs 21 and 24, and the rings 23 and 24 are made of a steel having a Young's modulus of $2 \times 10^6$ kg/cm², the Young's moduli of the piezoelectric elements 25 and 26, and the electrode 27 are the same value as the steel, the sum of the cross-sectional areas of the rings 23 and 24 is 2 cm², the cross-sectional area of the sensing member 28 is 1.11 cm², and the axial length of the rings 23 and 24 is 0.4 cm.

In the case of Fmax = 3,600 kg, the value d of the clearance 30 necessary to set the piezoelectric element maximum internal stress $\sigma p$max to 300 kg/cm² is derived from substituting the above-identified values for the corresponding variables in equation (11) as follows:

$$d = 2.7 \times 10^{-4} \text{ (cm)}$$

$$d = 2.7 (\mu m) \quad (12)$$

By substituting d = 2.7 $\mu$m and the above-identified values for the corresponding variables in equation (10), the piezoelectric element internal stress $\sigma p$ is given as follows:

$$\sigma p \approx (F - 2,700 \text{ (kg)})/3 \quad (13)$$

Thus, when the external force F exerted on the pressure sensor 20 increases above the threshold value Fs = 2,700 kg, the sensor 20 generates an effective output.

In general, the clamping force of the bolt 106 on the cylinder head 104 and the cylinder block 102 is set to around 3,500 kg. The threshold value Fs = 2,700 kg is smaller than this clamping force value. Accordingly, the upper face of the upper piezoelectric element 25 remains in contact with the lower face of the upper disc 21 when the pressure sensor 20 is in place around the bolt 106, as described previously. The constant internal stress of the piezoelectric elements 25 and 26 resulting from this clamping force is adequately smaller than the lower limit, e.g., 500 kg/cm², above which operation of the piezoelectric elements 25 and 26 is inaccurate or otherwise unacceptable. As a result, the output from the pressure sensor 20 is an accurate indication of the pressure in the combustion chamber 108.

FIG. 8 shows a first modified pressure sensor 40, which includes an annular spacer 41 disposed in the inside space and extending in coaxial alignment with the upper piezoelectric element 25. The lower face of the spacer 41 contacts and is attached to the upper face of the upper piezoelectric element 25. The spacer 41 is made of metal susceptible to plastic deformation and hence having a relatively small maximum internal stress, such as soft iron or aluminum. The axial dimensions of the piezoelectric elements 25 and 26, and the electrode 27 of this sensor 40 are smaller than those of the previous sensor 20. In the case where no external force is applied to this sensor 40, the upper face of the spacer 41 is separated from the lower face of the upper disc 21 by the clearance 30.

When the external force F exerted on the sensor 40 exceeds the threshold value Fs, the spacer 41 comes into contact with the upper disc 21. The output from the upper piezoelectric element 25 is generated between the electrode 27 and the upper disc 21 via the spacer 41.

Before the final step of assembling the sensor 40, i.e. while the upper disc 21 is still separate from the rings 23 and 24, as shown in FIG. 9, the sum of the original axial dimensions of the piezoelectric elements 25 and 26, the electrode 27, and the spacer 41 is slightly larger than the axial dimension of the rings 23 and 24, so that the upper end of the spacer 41 slightly projects from the rings 23 and 24. In the final assembling step, while a clamping force having a value equal to the maximum external force Fmax is applied to the discs 21 and 22 as shown in FIG. 10, the discs 21 and 22 are welded to the rings 23 and 24. After the clamping force is released, the clearance 30 is formed, since the spacer 41 is more easily plastically deformed than the rings 23 and 24. Adjustment of the force ensures an accurate setting of the clearance 30. The value of the clearance 30 is given by substituting the stress $\sigma s$ on the spacer 41 for $\sigma p$max in equation (11).

Figure 11:
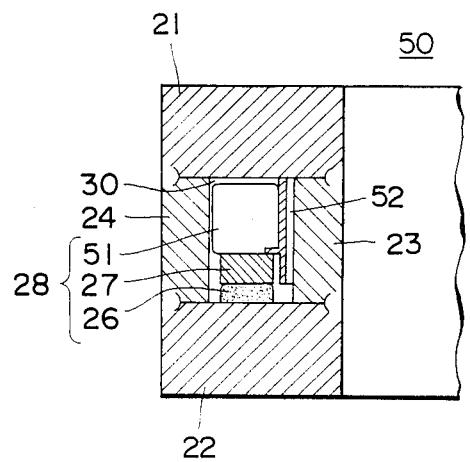
FIG. 11 is a longitudinal section of a second modified pressure sensor of this invention.

FIG. 11 shows a second modified pressure sensor 50, which includes an annular spacer 51 similar in configuration to the previous spacer 41. This sensor 50 has no upper piezoelectric element. The lower face of the spacer 51 contacts the upper face of the electrode 27. The upper face of the spacer 51 is separated from the lower face of the upper disc 21 by the clearance 30 when no external force is exerted on the sensor 50. The spacer 51 is made of plastic.

Figure 12:
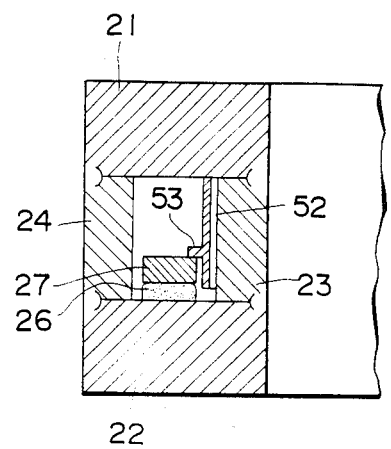
FIG. 12 is a longitudinal section of the second modified pressure sensor before plastic is injected into the inside space.
Figure 13:
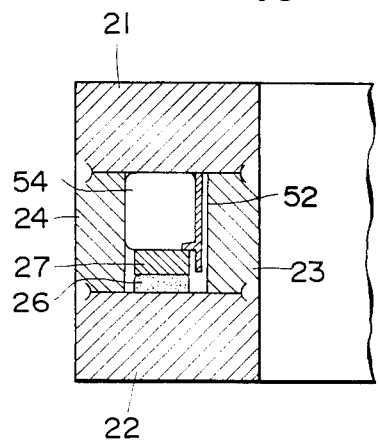
FIG. 13 is a longitudinal section of the second modified pressure sensor under conditions where the plastic has just been injected into the inside space.

When the discs 21 and 22 are welded to the rings 23 and 24, as shown in FIG. 12, the spacer 51 is not yet formed and the piezoelectric element 26 and the electrode 27 are temporarily retained by a supporter 53 formed on an insulating tube 52 disposed within the inside space. Subsequent to the welding step, liquid plastic 54 is injected into the section of the inside space between the upper disc 21 and the electrode 27 via an injection inlet formed through the outer ring 24, as shown in FIG. 13. After this injection step, the plastic 54 is hardened by a well-known chemical reaction or other treatment, so that the spacer 51 is the end product of the plastic 54 and the clearance 30 results from shrinkage of the plastic 54 during hardening, as shown in FIG. 11. In the case of a thermoplastic 54, the plastic 54 is softened by heating and is then injected into the inside space before being hardened by cooling. Since the supporter 53 is more easily plastically deformed than the piezoelectric element 26, substantially no pressure or force is exerted on the piezoelectric element 26 when the sensor 50 is clamped.

Figure 14:
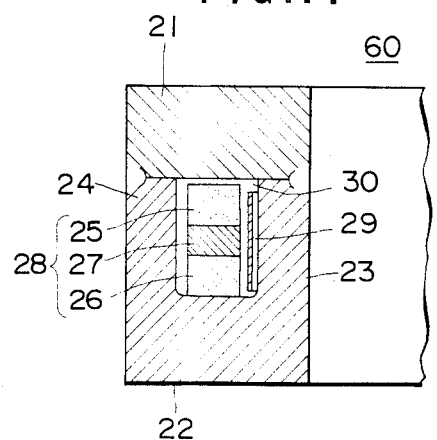
FIG. 14 is a longitudinal section of a third modified pressure sensor of this invention.

FIG. 14 shows a third modified pressure sensor 60, which includes a lower disc 22 formed integrally with the rings 23 and 24. Since adjustments of the axial dimensions of the rings 23 and 24 to equal values are performed by common processes, accurate and easy adjustment can be realized. The integral structure of the third modified sensor 60 can also be applied to the first and second modified sensors 40 and 50 of FIGS. 8 and 11.

Figure 15:
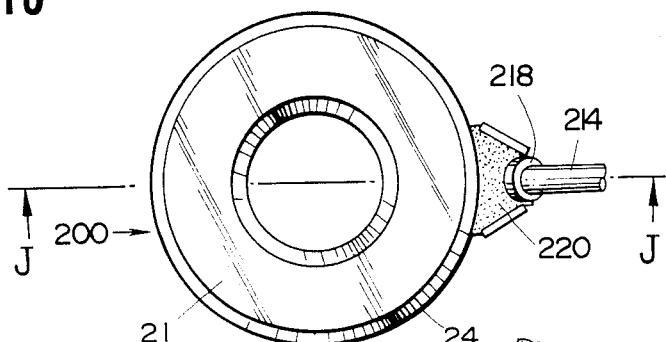
FIG. 15 is a top view of a fourth modified pressure sensor of this invention.
Figure 16:
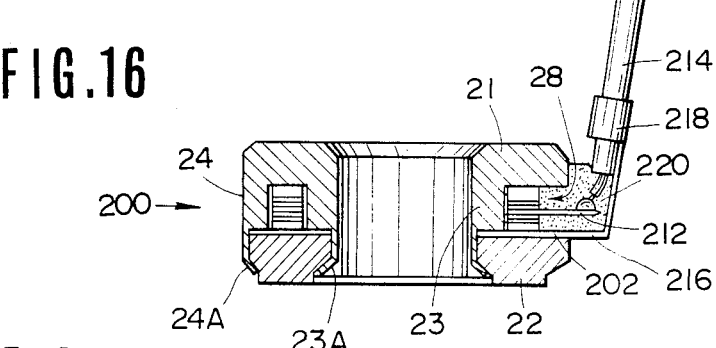
FIG. 16 is a sectional view taken along the line J—J of FIG. 15.
Figure 17:
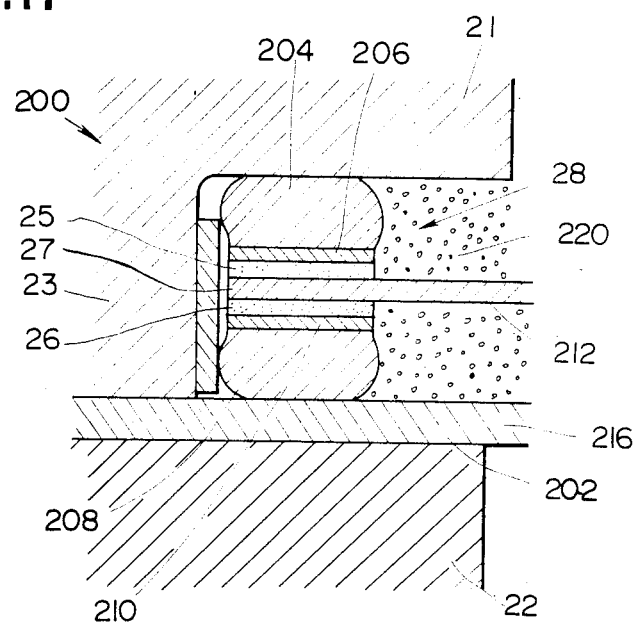
FIG. 17 is an enlarged view of an essential portion of FIG. 16.

FIGS. 15 to 17 show a fourth modified pressure sensor 200 having a casing or body, which includes an upper disc 21, a lower disc 22, an inner ring 23, and an outer ring 24 of an axial dimension equal to that of the inner ring 23. The upper disc 21, the inner ring 23, and the outer ring 24 are formed integrally with each other. The sensor body defines an annular inside space, within which a ring-shaped sensing member 28 is disposed. The sensing member 28 separates from the upper disc 21 by a predetermined clearance under conditions where no force is applied across the sensor body.

The pressure sensor 200 includes a ring-shaped clamp 202 coaxially positioned between the lower disc 22 and each of the rings 23 and 24. The clamp 202, the upper disc 21, and the rings 23 and 24 define the inside space.

As best shown in FIG. 17, the sensing member 28 includes ring-shaped upper and lower piezoelectric elements 25 and 26, and an annular electrode 27 interposed between the piezoelectric elements 25 and 26. The sensing member 28 also includes main and auxiliary ring-shaped upper spacers 204 and 206, and main and auxiliary ring-shaped lower spacers 208 and 210. The main spacers 204 and 208 are considerably thicker than the auxiliary spacers 206 and 210. These spacers 204, 206, 208, and 210 align coaxially with the piezoelectric elements 25 and 26, and the electrode 27. The elements 204, 206, 25, 27, 26, 210, 208, and 202 are arranged in that order between the discs 21 and 22.

The sensor body and the electrode 27 are made of metal. The spacers 204, 206, 208, and 210 are also made of metal. An electrical output signal from the upper piezoelectric element 25 can be applied between the electrode 27 and the sensor body via the upper spacers 204 and 206. An electrical output signal from the lower piezoelectric element 26 is applied between the electrode 27 and the sensor body via the lower spacers 208 and 210. The sensing member 28 is spaced from the outer ring 24. The sensing member 28 is spaced from the inner ring 23 by an insulating tube 29 disposed within the inside space.

The electrode 27 has a radially outward extension 212 which extends through a radial hole formed in the outer ring 24. The extension 212 is spaced from the outer ring 24. As best shown in FIG. 16, a cable 214 includes covered leads soldered to the outer end of the extension 212. The electrical signal from the piezoelectric elements 25 and 26 is outputted via the cable 214 and the sensor body. The clamp 202 has an outward projection 216 securely provided with a retainer 218. The cable 214 is held by the retainer 218. A molded plug or member 220 made of insulating material fills the space between the extension 212 and the section of the outer ring 24 defining the radial hole. The molded plug or member 220 also fills the space between the outer ring 24 and the retainer 218 and covers the connection between the cable 214 and the extension 212.

As viewed in FIG. 16, the lower disc 22 is provided with tapered surfaces along the inner and the outer edges of the lower end thereof. The inner ring 23 and the outer ring 24 have downwardly projecting collars 23A and 24A respectively between which the lower disc 22 is located. The collar 23A of the inner ring 23 is bent outwards into hard engagement with the inner tapered surface of the lower disc 22. The collar 24A of the outer ring 24 is bent inwards into hard engagement with the outer tapered surface of the lower disc 22. In this way, the lower disc 22 is fixedly retained by the collars 23A and 24A.

Steps of assembling the pressure sensor 200 are as follows: First, the components are placed where the elements 204, 206, 25, 27, 26, 210, 208, and 202 are sandwiched between the discs 21 and 22. The sum of the original axial dimensions of the elements 204, 206, 25, 27, 26, 210, and 208 is chosen to be substantially equal to or slightly greater than the original axial dimension of the rings 23 and 24, that is, the original axial dimension of the inside space to be formed in the sensor body. The metal forming the main spacers 204 and 208 is relatively easy to plastically deform in comparison with the metals forming the discs 21 and 22, the rings 23 and 24, the electrode 212, and the clamp 202. The collars 23A and 24A of the rings 23 and 24 are originally straight. Second, by using a suitable deforming or caulking apparatus, the collars 23A and 24A of the rings 23 and 24 are bent and simultaneously a predetermined clamping force is applied between the discs 21 and 22 in a single step. As a result, hold of the lower disc 22 by the collars 23A and 24A is attained. Also, the main spacers 204 and 208 are plastically deformed by predetermined extents. Finally, the applied force is released. Releasing the clamping force results in a predetermined clearance between the sensor body and the upper surface of the sensing member 28, since the main spacers 204 and 208 have plastically deformed. This clearance varies as a function of the clamping force. In this case, the radial component of the entire applied force substantially causes bend of the collars 23A and 24A and the axial component thereof defines the clamping force between the discs 21 and 22.

After assembled, the complete pressure sensor 200 is attached in place and is thus clamped between the cylinder head bolt and the cylinder head by a predetermined force stronger than a level at which the clearance is traversed.

It should be noted that the application of the clamping force may be performed in a step different from the step of bending the collars 23A and 24A.

What is claimed is:

1. A pressure sensor comprising:
   (a) a body having first and second opposing inner surfaces defining an inside space therebetween; and
   (b) a sensing member disposed within the inside space and having first and second opposite surfaces, the first surface of the sensing member contacting the first inner surface of the body, the second surface of the sensing member being separated from the second inner surface of the body by a predetermined clearance so that the second surface of the sensing member comes into contact with the second inner surface of the body only when the external force exerted on the body exceeds a predetermined level.

2. A pressure sensor as recited in claim 1, wherein the sensing member comprises:
   (a) a first piezoelectric element having first and second opposite surfaces, the first surface of the first piezoelectric element contacting the first inner surface of the body;
   (b) an electrode having first and second opposite surfaces, the first surface of the electrode contacting the second surface of the first piezoelectric element; and
   (c) a second piezoelectric element having first and second opposite surfaces, the first surface of the second piezoelectric element contacting the second surface of the electrode, the second surface of the second piezoelectric element being separated from the second inner surface of the body by the predetermined clearance.

3. A pressure sensor as recited in claim 1, wherein the sensing member comprises:
   (a) a first piezoelectric element having first and second opposite surfaces, the first surface of the first piezoelectric element contacting the first inner surface of the body;
   (b) an electrode having first and second opposite surfaces, the first surface of the electrode contacting the second surface of the first piezoelectric element;
   (c) a second piezoelectric element having first and second opposite surfaces, the first surface of the second piezoelectric element contacting the second surface of the electrode; and
   (d) a spacer having first and second opposite surfaces, the first surface of the spacer contacting the second surface of the second piezoelectric element, the second surface of the spacer being separated from the second inner surface of the body by the predetermined clearance.

4. A pressure sensor as recited in claim 1, wherein the sensing member comprises:
   (a) a piezoelectric element having first and second opposite surfaces, the first surface of the piezoelectric element contacting the first inner surface of the body;
   (b) an electrode having first and second opposite surfaces, the first surface of the electrode contacting the second surface of the piezoelectric element; and
   (c) a spacer having first and second opposite surfaces, the first surface of the spacer contacting the second surface of the electrode, the second surface of the spacer being separated from the second inner surface of the body by the predetermined clearance.

5. A pressure sensor as recited in claim 1, wherein the sensing member comprises:
   (a) a first main spacer having first and second opposite surfaces, the first surface of the first main spacer contacting the first inner surface of the body;
   (b) a first auxiliary spacer having first and second opposite surfaces, the first surface of the first auxiliary spacer contacting the second surface of the first main spacer;
   (c) a first piezoelectric element having first and second opposite surfaces, the first surface of the first piezoelectric element contacting the second surface of the first auxiliary spacer;
   (d) an electrode having first and second opposite surfaces, the first surface of the electrode contacting the second surface of the first piezoelectric element;
   (e) a second piezoelectric element having first and second opposite surfaces, the first surface of the second piezoelectric element contacting the second surface of the electrode;
   (f) a second auxiliary spacer having first and second opposite surfaces, the first surface of the second auxiliary spacer contacting the second surface of the second piezoelectric element; and
   (g) a second main spacer having first and second opposite surfaces, the first surface of the second main spacer contacting the second surface of the second auxiliary spacer, the second surface of the second main spacer being separated from the second inner surface of the body by the predetermined clearance.

6. A pressure sensor comprising:
   (a) concentrically spaced inner and outer rings having equal axial dimensions;
   (b) axially spaced first and second discs extending coaxially with respect to the rings and each having a central bore, the discs sandwiching the rings and defining an annular inside space in conjunction with the rings;
   (c) a first annular piezoelectric element coaxially disposed within the inside space and having first and second opposite faces, the first face of the first piezoelectric element contacting a face of the first disc defining the inside space;
   (d) an annular electrode coaxially disposed within the inside space and having first and second opposite faces, the first face of the electrode contacting the second face of the first piezoelectric element; and
   (e) a second annular piezoelectric element coaxially disposed within the inside space and having first and second opposite faces, the first face of the second piezoelectric element contacting the second face of the electrode, the second face of the second piezoelectric element being separated from a face of the second disc defining the inside space by a predetermined clearance so that the second face of the second piezoelectric element comes into contact with the face of the second disc only when the external force exerted between the discs exceeds a predetermined level.

7. A pressure sensor as recited in claim 6, wherein the first disc is integral with the rings.

8. A pressure sensor comprising:

(a) concentrically spaced inner and outer rings having equal axial dimensions;

(b) axially spaced first and second discs extending coaxially with respect to the rings and each having a central bore, the discs sandwiching the rings and defining an annular inside space in conjunction with the rings;

(c) a first annular piezoelectric element coaxially disposed within the inside space and having first and second opposite faces, the first face of the first piezoelectric element contacting a face of the first disc defining the inside space;

(d) an annular electrode coaxially disposed within the inside space and having first and second opposite faces, the first face of the electrode contacting the second face of the first piezoelectric element; and (e) a second annular piezoelectric element coaxially disposed within the inside space and having first and second opposite faces, the first face of the second piezoelectric element contacting the second face of the electrode; and (f) an annular spacer coaxially disposed within the inside space and having first and second opposite faces, the first face of the spacer contacting the second face of the second piezoelectric element, the second face of the spacer being separated from a face of the second disc defining the inside space by a predetermined clearance so that the second face of the spacer comes into contact with the face of the second disc only when the external force exerted between the discs exceeds a predetermined level.

9. A pressure sensor comprising:

(a) concentrically spaced inner and outer rings having equal axial dimensions;

(b) axially spaced first and second discs extending coaxially with respect to the rings and each having a central bore, the discs sandwiching the rings and defining an annular inside space in conjunction with the rings;

(c) an annular piezoelectric element coaxially disposed within the inside space and having first and second opposite faces, the first face of the first piezoelectric element contacting a face of the first disc defining the inside space;

(d) an annular electrode coaxially disposed within the inside space and having first and second opposite faces, the first face of the electrode contacting the second face of the first piezoelectric element; and (e) an annular spacer coaxially disposed within the inside space and having first and second opposite faces, the first face of the spacer contacting the second face of the piezoelectric element, the second face of the spacer being separated from a face of the second disc defining the inside space by a predetermined clearance so that the second face of the spacer comes into contact with the face of the second disc only when the external force exerted between the discs exceeds a predetermined level.

10. A pressure sensor as recited in claim 9, wherein the spacer is made of plastic.

11. A pressure sensor comprising:

(a) body in the form of a normal annular washer and having first and second opposing inner surfaces defining an annular inside space therebetween, the inside space being coaxial with the body;

(b) a first annular main spacer coaxially disposed within the inside space and having first and second opposite faces, the first face of the first main spacer contacting the first inner surface of the body;

(c) a first annular auxiliary spacer coaxially disposed within the inside space and having first and second opposite faces, the first face of the first auxiliary spacer contacting the second face of the first main spacer;

(d) a first annular piezoelectric element coaxially disposed within the inside space and having first and second opposite faces, the first face of the first piezoelectric element contacting the second face of the first auxiliary spacer;

(e) an annular electrode coaxially disposed within the inside space and having first and second opposite faces, the first face of the electrode contacting the second face of the first piezoelectric element;

(f) a second annular piezoelectric element coaxially disposed within the inside space and having first and second opposite faces, the first face of the second piezoelectric element contacting the second face of the electrode;

(g) a second annular auxiliary spacer coaxially disposed within the inside space and having first and second opposite faces, the first face of the second auxiliary spacer contacting the second face of the second piezoelectric element; and (h) a second annular main spacer coaxially disposed within the inside space and having first and second opposite faces, the first face of the second main spacer contacting the second face of the second auxiliary spacer, the second face of the second main spacer being separated from the second inner surface of the body by a predetermined clearance so that the second face of the second main spacer comes into contact with the second inner surface of the body only when the external clamping force applied across the body exceeds a predetermined level.

* * * * *